United States Patent [19]
Seufert

[11] 3,900,188

[45] Aug. 19, 1975

[54] SCREW EXTRUDER HOUSING WITH A WEAR-RESISTANT LINING

[75] Inventor: Wilhelm Seufert, Korntal, Germany

[73] Assignee: Werner & Pfleiderer, Stuttgart-Feuerbach, Germany

[22] Filed: Nov. 13, 1973

[21] Appl. No.: 415,295

[30] Foreign Application Priority Data
Nov. 18, 1972 Germany.............................. 2256671

[52] U.S. Cl. ................. 259/192; 259/104; 425/208
[51] Int. Cl............................................. B29b 1/10
[58] Field of Search ............. 259/191, 192, 193, 194, 259/97, 9, 10, 5, 6, 7, 104, 109, 110; 425/208, 207, 209, 168, 376; 100/145, 146; 198/213, 214, 215

[56] References Cited
UNITED STATES PATENTS

| | | | |
|---|---|---|---|
| 3,126,197 | 3/1964 | Maurer............................. | 259/104 |
| 3,407,438 | 10/1968 | Selbach............................. | 259/192 |
| 3,458,894 | 8/1969 | Wheeler............................. | 259/191 |
| 3,650,511 | 3/1972 | Henschel............................ | 259/104 |
| 3,674,401 | 7/1972 | Annis.................................. | 425/208 |

*Primary Examiner*—Robert W. Jenkins
*Attorney, Agent, or Firm*—Hane, Baxley & Spiecens

[57] ABSTRACT

There is disclosed a method of producing a wear-resistant lining in the housing of a screw extruder. This method provides that a cylindrical sleeve of wear-resistant material is inserted into the extruder housing. The sleeve is dimensioned so that space is left between the outside of the sleeve and the housing and this space is filled with a hardening filler material which upon hardening secures the sleeve within the housing.

There is also disclosed a screw extruder including a sleeve made of a wear-resistant material. This sleeve is secured in the correct position in the housing by a rigid filler material filling a space left between the outside of the sleeve and the housing.

5 Claims, 5 Drawing Figures

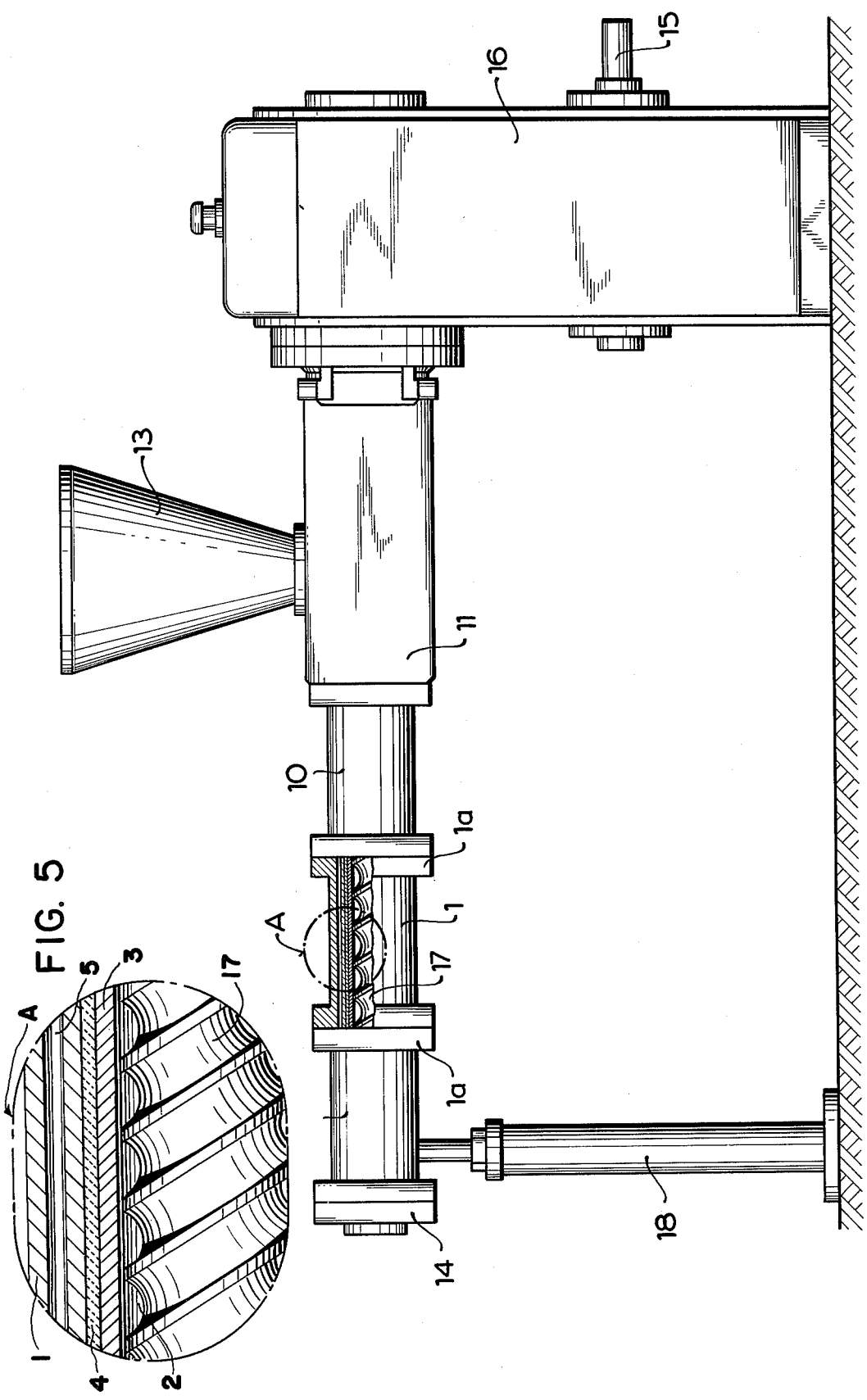

SCREW EXTRUDER HOUSING WITH A WEAR-RESISTANT LINING

The invention relates to a method of producing a wear-resistant lining for the working space in the housing of a screw extruder, and particularly in the housing of an extruder having more than one extruder screw.

BACKGROUND

The elongate space in the housing of a screw extruder of the general kind above referred to constitutes the working space of the extruder in which by coaction of the wall surface of the working space with one or more screw extruders processing of material is effected. This wall surface of the housing is subjected to wear and tear and such wear and tear is particularly heavy when certain types of materials are to be processed.

Various attempts are known to protect the inside of an extruder housing against wear and tear by lining the same. It is known for twin-screw extruders as shown for instance in German Utility Model 1,943,626 to insert into two parallel housing bores which communicate with each other two sleeves made of wear-resistant material, and to join these sleeves by generally saddle-shaped strips. These strips are inserted into grooves at the junction between the two parallel bores for the two extruder screws and to clamp these inserts to the housing proper. The strips are tightened by means of clamping screws from the outside of the housing and also have a wear-resistant surface. This type of protection against wear and tear is rather expensive; moreover, it is difficult to produce the linings within acceptable tolerances.

It is also known to provide a liner for the housing of a twin screw extruder, for instance from German published Application No. 1,529,972 which consists of two metal tubes or sleeves which are disposed in mutually parallel relationship and are coated on the inside with a layer of wear-resistant metal. These two tubes are slotted and intersect each other. Ribs are provided at the intersection lines and extend into the interior of the metal tubes. Each of the ribs is limited by two surfaces which are disposed at substantially right-angles relative to each other. The surfaces of these two ribs are paired in parallel relationship. The inner wear-resistant metal layer is produced by precipitating or otherwise injecting metal in its liquid stage upon the inner tube walls before the same are slotted. The disadvantage of this method of producing a wear-resistant layer is that the choice of material is rather limited. Moreover, the manufacture of protective coatings of this type is rather expensive since a substantial number of operational steps is required.

THE INVENTION

It is a broad object of the invention to cover the surfaces defining the working space or spaces in the housing of a screw extruder o' 'he g⋅ ⋅l kind above referred to with a highly wear-resist  lining which can be produced at relatively low cosɩs and can be replaced or repaired if necessary by simple and inexpensive operations.

Another object of the invention is to provide a novel and improved method of producing protective linings defining the working space or spaces of a screw extruder which permits a wide selection of wear-resistant lining material so that the properties of the linings can be readily adjusted to specific requirements of the processing to be carried out with the extruder.

It is also a broad object of the invention to provide a highly wear-resistant lining within the housing of a screw extruder, and particularly within the housing of an extruder having two or more extruder screws.

SUMMARY OF THE INVENTION

The aforedescribed objects, features and advantages, and other objects, features and advantages which will be pointed out hereinafter are obtained by inserting into the housing of the extruder one or more suitably dimensioned sleeves, one for each screw to be installed in the housing, and to secure such sleeves temporarily in the required positions. The peripheral outlines of these sleeves are such that space remains between the outside of the sleeves and the inner wall of the housing proper. This space is filled by pouring or casting into it a suitable material in flowable condition. Various materials are suitable for the purpose; it is only essential that the melting point of the lining material is lower than the melting point of the material of which the sleeves are made, and also lower than the melting point of the material used for the extruder housing proper.

The method according to the invention makes possible manufacture of a wear-resistant lining in an extruder housing by inserting cylindrical sleeve or sleeves made of a wear-resistant material.

The method is carried out by making the outer peripheral outline of the sleeve or sleeves smaller than the inner peripheral outline of the bore within the housing and by filling the space thus left between the outside of the sleeve or sleeves and the inside of the housing with a suitable material, and more specifically, with a hardening material in liquefied condition which has a melting point lower than the melting point of the material of which the sleeve or sleeves is made and also lower than the melting point of the material of which the extruder housing is made.

A wear-resistant lining for twin-screw extruders can be produced in a particularly simple manner by forming a liner of two mutually parallel hollow cylinders which are lengthwise slotted and intersect, and which are joined along the intersection lines.

In the event a particularly high conduction of heat from or to the material to be processed in the extruder is desired, the invention also provides that ducts for the passage of a temperature-controlling material are provided in the intermediate space between the sleeves and the inside of the extruder housing. These ducts may be formed in the filler material which as previously described, consists of a material with a low melting point.

In the event that the filler material poured into the intermediate space between the sleeve or sleeves and the housing wall is such that it can be machined or otherwise processed at room temperature, the ducts can be produced according to the invention in a particularly simple manner by providing in the wear-resistant sleeves themselves grooves or recesses which serve as ducts for a cooling or heating medium.

The advantages which are obtained by the invention reside in particular in that highly wear-resistant housing linings can be produced at high tolerances in a very simple and relatively inexpensive manner. Moreover, if the protective lining is worn or damaged, it can be easily replaced or repaired by forcing the lining out of the housing by means of a suitable pressure tool or by heating the wear-resistant sleeve or sleeves sufficiently to soften it. A new or repaired sleeve can then be mounted as described. Complex wear-resistant linings for multiple screw extruders can be formed in a very simple manner by combining indivudal cylindrical sleeves suitably cut open. The thus combined sleeves are easily joined by pouring the filler material into the afore-described space between the outsides of the combined sleeves and the inside of the extruder housing. Finally, any burrs or uneven spots which may be present along the joining lines can be easily smoothed out by grinding or other suitable machining operations.

BRIEF DESCRIPTION OF THE DRAWING

In the accompanying drawing several embodiments of the invention are shown by way of illustration and not by way of limitation.

In the drawing:

FIG. 4 is a diagrammatic elevational view, partly in section, of a screw extruder the housing of which includes a wear-resistant lining according to the invention; and FIG. 5 is a sectional view of the sectional housing portion of FIG. 4 on an enlarged scale.

DETAILED DESCRIPTION OF THE DRAWING

Figure 1:
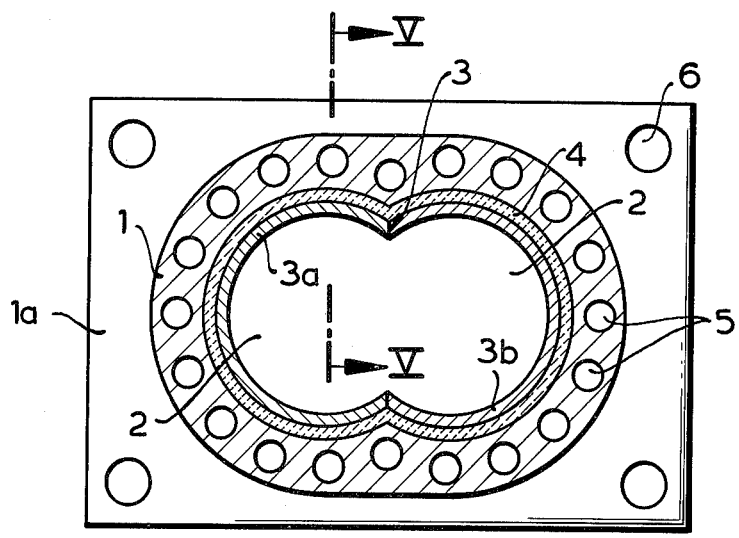
FIG. 1 is a cross-sectional view of a wear-resistant lining according to the invention within the housing of a twin-screw extruder.

Referring now to the figures in greater detail, and first to FIG. 1, this figure should be visualized as showing an extruder housing section 1 in the direction of its lengthwise axis. A flange 1a on the housing section serves to connect this section to another section (not shown). There are shown within the housing section spaces 2 the peripheral outline of which is larger than the peripheral outline of the actual working space for the screws (not shown) as will more fully appear from the subsequent description. The spaces within the housing section are defined by two passages of circular cross-sectional outline. The two cylindrical outlines intersect thereby forming the two cylindrical working spaces 2 within the housing. A sleeve 3 composed of parts 3a and 3b is fitted into the cylindrical working spaces 2. This sleeve is made of a suitably highly wear-resistant material. As it is evident, the sleeve 3 defines two cylindrical intersecting passages, each constituting a working space for a screw. As it is also evident, the outside of sleeve 3 and the inside of housing section 1 define therebetween a space 4 which has approximately the same width along its entire length. This intermediate space is filled with a suitable hardening filler material but capable of being made flowable for casting or pouring. This material for becoming flowable must have a lower melting point than the material used for the extruder housing proper and for sleeve 3. Moreover, it must be capable of producing a good bond with both the material used for the extruder housing and the sleeve. It also should have a good heat-conductivity. Many materials of this kind are well known to experts in the art and are readily available in the market. Suitable examples are, for instance, white metal alloys, heat-resistant adhesives composed of a suitable synthetic plastic and casting cement or concrete.

The aforedescribed two lengthwise cut open cylindrical sleeve parts 3a and 3b are both made of wear-resistant material and are fitted into housing section 1 during the manufacture of the lining. The housing section need to be only rather roughly machined on its inside. The sleeve parts are temporarily held in the required positions by means of suitable and conventional pattern clamps. Subsequently, the intermediate space 4 is filled with the afore-referred to flowable material. After this material has hardened, the clamps are removed and the inside walls of sleeve parts 3a and 3b which constitute the working spaces proper are fine machined if necessary. The contact surfaces between the two wear-resistant sleeve parts need only be ground so that they are flush, that is, no protruding parts should be left. No further sealing between the coacting sleeve parts is required.

Ducts 5 may be provided in the wall of housing 1 for circulating a cooling or heating medium. Bores 6 in joining flange 1a facilitate attachment of several sections to each other, for instance by nuts or bolts or rivets.

Figure 2:
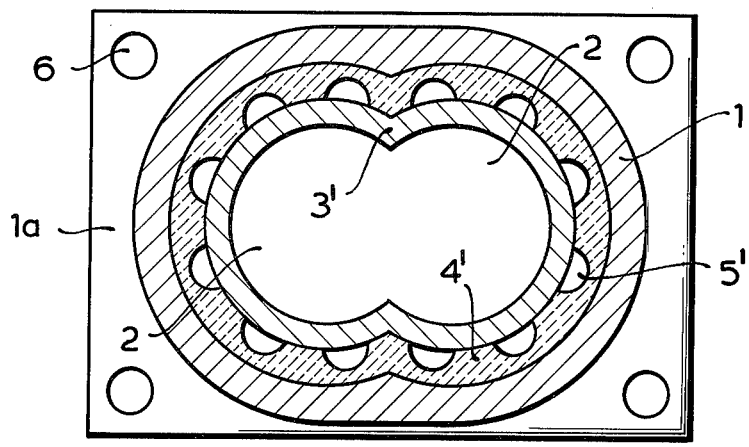
FIG. 2 is a cross-sectional view of a modification of a wear-resistant lining according to the invention within the housing of a twin-screw extruder.

FIG. 2 shows an arrangement in which ducts 5' for circulating a temperature controlling medium are located in intermediate space 4', which as previously described is filled with a hardened filler material. More specifically, the ducts are provided between lining 3 and the inside wall of housing section 1. The ducts 5' are formed by means of cores inserted into the intermediate space prior to the filling of this space with liquid filler material and are removed after hardening of the filler material.

In the exemplification according to FIG. 2, the intermediate space 4' has a somewhat greater radial width than the space 4 according to FIG. 1 and sleeve 3' is also shown as having walls of a heavier gauge. Such heavy sleeve can be formed by casting, for instance by using a hard metal alloy. Such manufacture of the sleeve permits production thereof in one piece, thereby avoiding machining and grinding the saddle-shaped surfaces along which the sleeve parts as shown in FIG. 1 abut against each other. The inside surfaces of one-piece cast sleeve 3' are fine machined after the sleeve has been cast directly within the housing.

Figure 3:
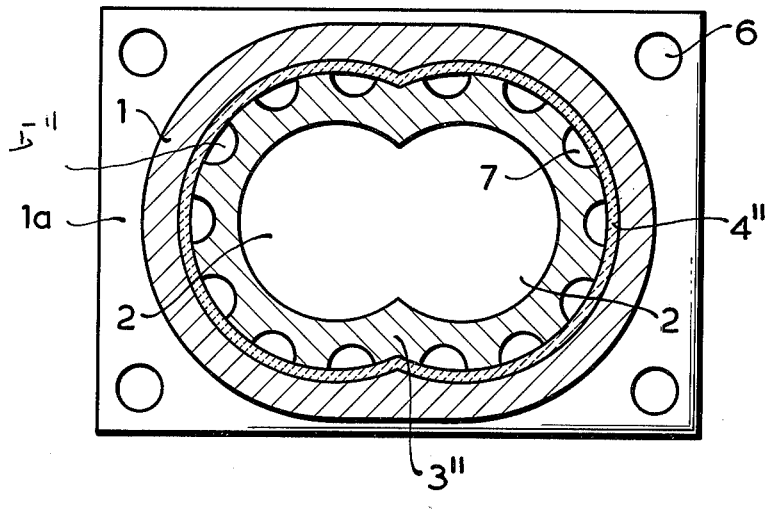
FIG. 3 is a cross-sectional view of another modification of a wear-resistant lining according to the invention within the housing of a twin-screw extruder.

According to FIG. 3, the ducts 5'' for circulating a temperature controlling medium along the space 4'' between sleeve 3'' and the inside surface of housing section 1 is filled with suitable hardening casting material as previously described. The filling of the intermediate space 4'' and casting of lining 3'' are particularly simple if a filler material is used for filling space 4'' which can be machined at room temperature.

The grooves or spaces forming ducts 5'' in lining 3'' are obtained by insertion of cores which are later removed.

The ducts for conducting the heating or cooling medium need not to extend as shown always in the direction of the lengthwise axis of the extruder housing. They can obviously be shaped as it is suitable for the particular purpose.

The extruder screws are not shown in FIGS. 1 to 3.

In the event a wear-resistant lining produced in accordance with the invention as described shows wear after having been in operation or is damaged, such lining can be replaced or even repaired without difficulty. It is only necessary to press the inner sleeve 3 out of housing section 1 by a suitable pressure tool. As is obvious, the filler material which is used has inherently a much lower resistance to shear forces than the material from which the housing section 1 is made. Hence, pushing or forcing out of a lining requiring replacement is quite simple in practice. In the event filling of the intermediate space is effected by using white metal, the lining can be removed by simply heating the filler material until it becomes soft or flowable as the melting point thereof is quite low.

After removal of any remaining parts of the filler material, a new sleeve of a wear-resistant material is inserted and the intermediate space is again filled as previously described by pouring into the space a suitable material. Such replacement of worn out linings can be repeated as often as it is necessary.

Referring now to FIG. 4, this figure shows an extruder the housing section 1 of which is cut open to show the connecting flanges 1a and also a further housing section 10, a feed or input housing section 11 and a discharge section 12 including an extrusion die 14 through which processed material is discharged by application of pressure. A motor (not shown) drives via a shaft 15 and a gearing mounted in a casing 16 two twin screws 17 in a conventional manner; only one of these screws being visible in FIG. 4. A stanchion 18 is preferably provided at the discharge end of the extruder.

An area A indicated in FIG. 4 by a dashed-dotted line is shown in FIG. 5 on an enlarged scale. The reference numerals used in FIGS. 4 and 5 refer to the same components as previously described.

The method according to the invention for producing a wear-resistant lining in the working space of an extruder may in some instances also be used for a single screw extruder housing. However, generally it is simpler with a single screw extruder to force-fit a sleeve made of a wear-resistant material directly into the cylindrical space within the housing; this space must of course be machined to a high tolerance.

While the invention has been described in detail with respect to certain now preferred examples and embodiments of the invention, it will be understood by those skilled in the art after understanding the invention, that various changes and modifications may be made without departing from the spirit and scope of the invention, and it is intended, therefore, to cover all such changes and modifications in the appended claims.

What is claimed is:

1. A screw extruder comprising in combination:
   an elongate housing including a lengthwise extending space;
   a sleeve made of a wear-resistant material inserted into said space, the inner peripheral outline of the housing being larger than the outer peripheral outline of the sleeve thereby defining within the housing a space intermediate the inside of the housing and the outside of the sleeve; and
   a hardened filler material filling said intermediate space, said filler having a melting point lower than the materials of which the housing and the sleeve are made.

2. The screw extruder according to claim 1 wherein said sleeve comprises two parts, each of said parts having the shape of a hollow cylindrical member including a lengthwise slot in its wall, and wherein joining means join said members in parallel relationship along the edges defining said slots in the members.

3. The screw extruder according to claim 2 wherein said joining means comprise said hardened filler filling said intermediate space.

4. The screw extruder according to claim 1 wherein said filler material includes lengthwise ducts for passing therethrough a medium for controlling the operational temperature of said sleeve.

5. The screw extruder according to claim 1 wherein said sleeve has lengthwise grooves in its outer surface, said grooves constituting ducts for passing therethrough a medium for controlling the operational temperature of the sleeve.

* * * * *